United States Patent [19]

Yoshikawa et al.

[11] Patent Number: 4,976,291
[45] Date of Patent: Dec. 11, 1990

[54] CENTRIFUGALLY MOLDED CONCRETE COMPOSITE PIPE

[75] Inventors: Nobuyoshi Yoshikawa, Omiya; Hiroshi Asano, Nagoya, both of Japan

[73] Assignees: Teikoku Hume Pipe Co., Ltd., Tokyo; Noritake Co., Limited, Nagoya, both of Japan

[21] Appl. No.: 418,735

[22] Filed: Oct. 3, 1989

Related U.S. Application Data

[63] Continuation of Ser. No. 168,869, Mar. 16, 1988, abandoned.

[30] Foreign Application Priority Data

Mar. 24, 1987 [JP] Japan .................. 62-068034

[51] Int. Cl.$^5$ .............................. F16L 9/08
[52] U.S. Cl. .................. 138/175; 138/174; 138/DIG. 6; 264/269
[58] Field of Search ............ 138/137, 140, 141, 145, 138/146, 172, 174, 175, 177, DIG. 6; 264/269

[56] References Cited

U.S. PATENT DOCUMENTS

| 2,305,017 | 12/1942 | Lewis . | |
|---|---|---|---|
| 2,624,097 | 1/1953 | Kistler | 138/145 |
| 2,675,333 | 4/1954 | Trout et al. . | |
| 2,774,383 | 12/1956 | Kidd | 138/145 |
| 3,080,253 | 3/1963 | Dietz et al. | 138/146 |
| 3,177,902 | 4/1965 | Reubenstein | 138/145 |
| 3,532,132 | 10/1970 | Rubenstein | 138/141 |
| 3,561,493 | 2/1971 | Maitlord et al. | 138/141 |
| 3,742,985 | 7/1973 | Rubenstein | 138/141 |
| 4,412,561 | 11/1983 | Sakaguchi et al. | 138/145 |

FOREIGN PATENT DOCUMENTS

| 516111 | 4/1981 | Australia . |
| 1936667 | 1/1970 | Fed. Rep. of Germany . |
| 2611293 | 9/1976 | Fed. Rep. of Germany . |
| 004115A | 2/1984 | United Kingdom . |

Primary Examiner—James E. Bryant, III
Attorney, Agent, or Firm—Lackenbach Siegel Marzullo & Aronson

[57] ABSTRACT

A concrete-type composite pipe having a cylindrical concrete layer and a corrosion protective layer formed in an inner surface of the drum mold; in a boundary region between the concrete layer and the corrosion protective layer, an intermediate resin/concrete layer having properties intermediate the concrete layer and the corrosion protective layer. The above mentioned concrete-type composite pipe is produced by rotating the drum mold while casting concrete thereinto to form a concrete layer of a uniform thickness using a centrifugal force exerted on the cast concrete, casting a mixture of hydrophilic resin and a hardener to form a resin layer on an inner surface of the formed concrete layer before the concrete layer starts to solidify, scattering aggregates or the like on the inner surface of the resin layer, accelerating the rotation to cause the aggregates or the like in the resin layer to form a corrosion protective layer of resin and aggregates and stopping the rotation after the hardening of the corrosion protective layer.

9 Claims, 3 Drawing Sheets

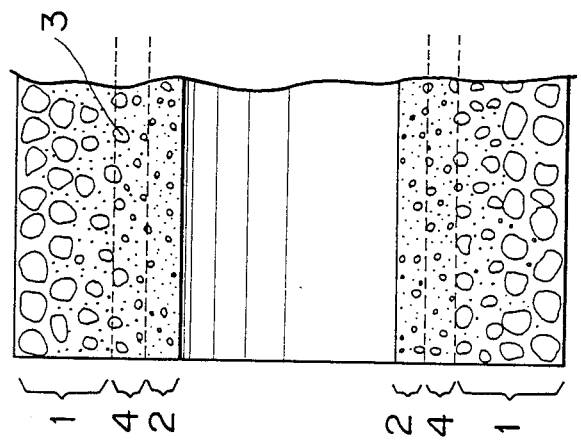
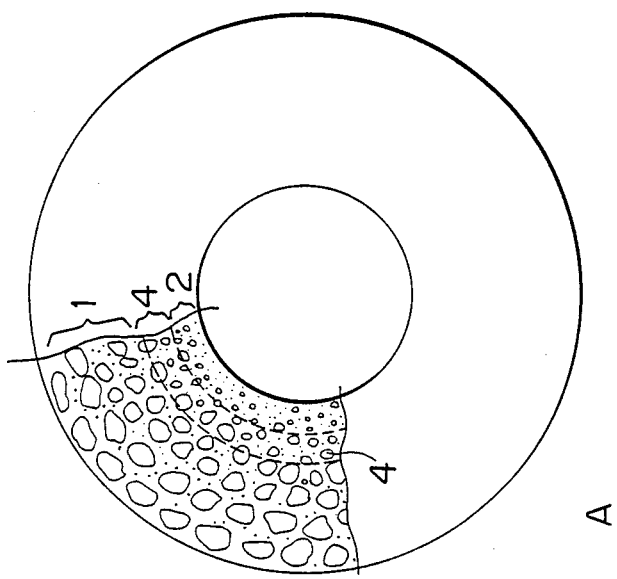
FIG. 1B
FIG. 1A

CENTRIFUGALLY MOLDED CONCRETE COMPOSITE PIPE

This application is a continuation of application Ser. No. 168,869, filed Mar. 16, 1988, now abandoned.

BACKGROUND OF THE INVENTION

The present invention relates to a concrete-type composite pipe having large regidity and strength as well as resistance against chemicals, and to a method of producing the same.

Conventional concrete-type pipes exhibit high rigidity and are cheaply produced, but lack resistance against chemicals.

There have further been provided synthetic resin-type pipes exhibiting excellent resistance against chemicals and increased strength. However, such pipes have low rigidity and are expensive to produce.

Furthermore, there have been provided a concrete-type composite pipe in which a corrosion protective layer of a tar-epoxy resin or of a mixture of epoxy resin and aggregate is formed on the inner surface or on the outer surface, or on both the inner and outer surfaces of the steam-cured concrete layer utilizing a conventional cheaply constructed concrete-type pipe that has high rigidity. However, due to difference in the coefficient of thermal expansion and in the coefficient of contraction between the corrosion protective layer and the concrete layer, the corrosion protective layer peels off at the boundary surface relative to the concrete layer. Therefore, the composite pipe could not fully exhibit its function with regard to the strength and resistance against chemicals.

Moreover, the corrosion protective layer is formed by pouring into a vessel a mixture obtained by kneading together the resin and the aggregate, carrying the vessel to pour the mixture onto the inner surface of the concrete layer after it is cured with steam, and spreading the mixture in a centrifugal manner, requiring cumbersome operation for kneading the materials and for carrying the resin. Furthermore, since the mixture lacks flowability, extended periods of time are required before the layer is formed maintaining a uniform thickness.

SUMMARY OF THE INVENTION

According to one aspect of the invention, there is provided a concrete type composite pipe comprising a cylindrical concrete layer; a corrosion protective layer concentrically laminated on said cylindrical concrete layer, said corrosion protective layer being formed of a mixture of resin and aggregates or the like; a mixed intermediate layer composed of resin and concrete formed in a boundary region between said cylindrical concrete layer and said corrosion protective layer, said mixed intermediate layer having properties intermediate said concrete layer and said corrosion protective layer.

According to another aspect of the invention, there is provided a method of producing a concrete-type composite pipe comprising the steps of (a) rotating a drum mold about an axis thereof; (b) casting concrete into said drum mold to shape said cast concrete into a concrete layer of a uniform the thickness on an inner surface of the drum mold by means of a centrifugal force generated by said rotation; (c) accelerating the rotation of said drum mold to obtain an increased centrifugal force such that water is squeezed out of the concrete layer onto an inner surface thereof; (d) stopping the rotation to remove said squeezed water from said concrete layer; (e) resuming the rotation of said drum mold while casting a mixture of hydrophilic resin and a hardener thereinto to form a resin layer on an inner surface of said concrete layer by means of a centrifugal force generated by said resumption of the rotation before said concrete layer solidifies; (f) continuing said rotation of the drum mold while scattering aggregates or the like onto an inner surface of said resin layer; (g) accelerating the rotation of said drum mold to increase the centrifugal force such that aggregates or the like are caused to precipitate in said resin layer to form a corrosion protective layer; and (h) stopping the rotation after said corrosion protective layer is hardened.

BRIEF DESCRIPTION OF THE DRAWINGS

FIG. 1A is a front view in section of a concrete-type composite pipe according to the present invention and FIG. 1B is a side view in section of the same;

FIG. 2A is a front view of an apparatus for practicing the method of producing the concrete-type composite pipe as shown in FIGS. 1A and 1B whereas

DETAILED DESCRIPTION OF THE EMBODIMENTS

A concrete-type composite pipe according to an embodiment of the present invention will now be described in conjunction with the drawings.

FIGS. 1A and 1B illustrate a concrete-type composite pipe A having a laminate structure in which a corrosion protective layer 2 consisting of a mixture of resin and aggregate (here, the word "aggregate" generally stands for material that is obtained by pulverizing Chamotte, material obtained by drying the sand or gravel, or a filler such as silica sand or calcium carbonate, which may be used alone or being blended together) is formed on the inner surface of a concrete layer 1. In the boundary region between the concrete layer 1 and the corrosion protective layer 2, there is formed the mixed intermediate layer 4 which is composed of a coarse granular aggregate 3, the resin which partly penetrates the concrete layer 1, and a concrete.

The mixed intermediate layer 4 composed of the resin and concrete exhibits properties such as coefficient of thermal expansion and coefficient of contraction that lie between those of the concrete layer 1 and the corrosion protective layer 2. Therefore, even when the pipe is subjected to the temperature change or is placed in the step of curing where contraction is inevitable, stress resulting from the difference in temperature stress and contraction by curing between the concrete layer 1 and the corrosion protective layer 2 is reduced with the result that the layers are not peeled off.

Therefore, the concrete layer 1 and the corrosion protective layer 2 are strongly and intimately adhered together into a unitary structure via the mixed intermediate layer 4 composed of resin and concrete, and whereby there are maintained high rigidity inherent in the concrete layer 1 and resistance against chemicals and strength inherent in the corrosion protective layer 2.

Though the outer layer was comprised of the concrete layer in the above-mentioned embodiment, it is also possible to realize a concrete-type composite pipe in which the outer layer is comprised of the corrosion protective layer or in which the corrosion protective layer is formed on both the inner and outer surfaces of the concrete layer.

Next, described below is a method of producing a concrete-type composite pipe having the mixed intermediate layer composed of the resin and concrete in accordance with the embodiment of the present invention wherein the outer layer is comprised of the concrete layer and the inner layer is comprised of the corrosion protective layer in the order of steps with reference to the drawigns.

Figure 2B:
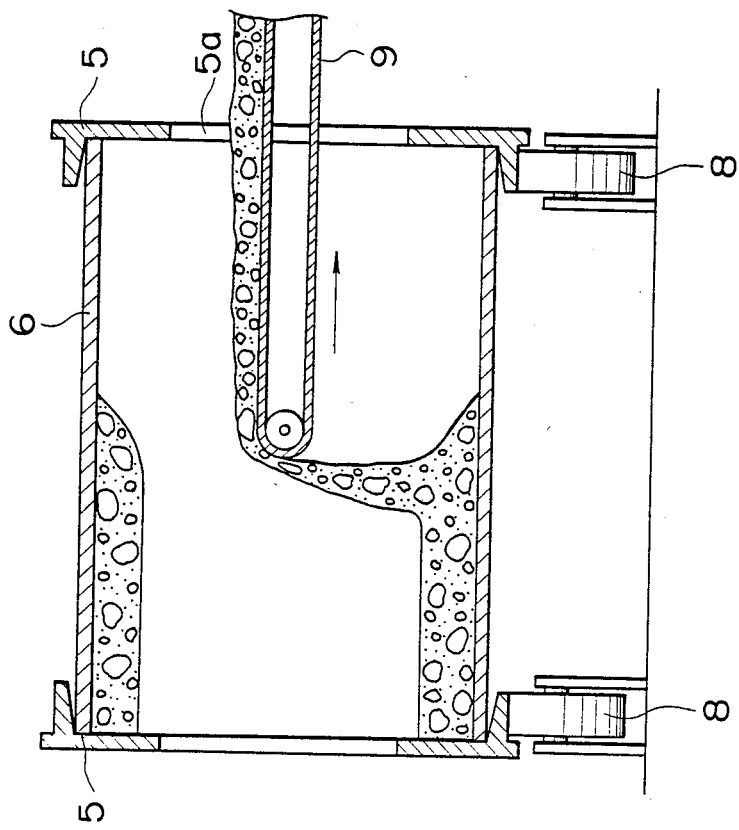
FIG. 2B is a cross section of FIG. 2A taken along the line X—X.
Figure 2A:
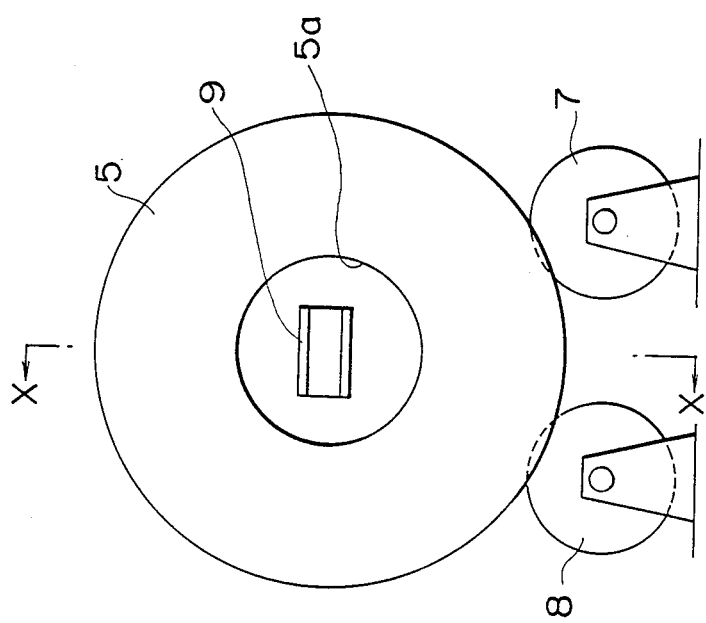

(a) Step for forming the concrete layer 1:

As shown in FIGS. 2A and 2B, a side molding frame 5 secured to both ends of a drum mold 6 is placed on a drive roller 7 and a driven roller 8. The driving force of a motor (not shown) is transmitted to the drive roller 7 to rotate said drum mold 6 such that an acceleration of centrifugal force of normally 3 to 5 g or at most up to 15 g is obtained at an inner periphery thereof.

In this condition, concrete is cast or poured into the drum mold 6 by means of a movable conveyor 9 which is inserted longitudinally therethrough by way of an opening 5a formed in one of the side molding frame 5. Then, said movable conveyor 9 is retracted outwardly of said drum mold 9 by way of said opening 5a to be stationed at a predetermined place. Within the drum mold 6, on the other hand, concrete layer of uniform thickness is formed in he inner surface of the drum mold 6. Thereafter, the motor output is raised to increase the rotation of the drum mold 6 to such an extent that acceleration of the centrifugal force in the proximity of the inner surface of the drum mold 6 is raised to a range of 20 to 50 g and preferably a range of 30 to 40 g. As a result, water is squeezed out of the concrete layer to tighten or physically harden said concrete layer. The time requried for this step depends on the thickness of the finished pipe, the consistency of concrete and the magnitude of the centrifugal force. In general, however, about 15 minutes are needed for the pipe of 500 m/m in diameter while 40 to 60 minutes are needed for that of 3 meters in diameter.

In this case, the radially inner portion of the concrete layer 1 is comprised of relatively large ampount of cement and fine aggregates to make the region relatively soft. Since the innermost portion of the layer is composed of water, said drum mold is stopped after the passage of above mentioned time period to discharge said water out of the drum mold.

Figure 3:
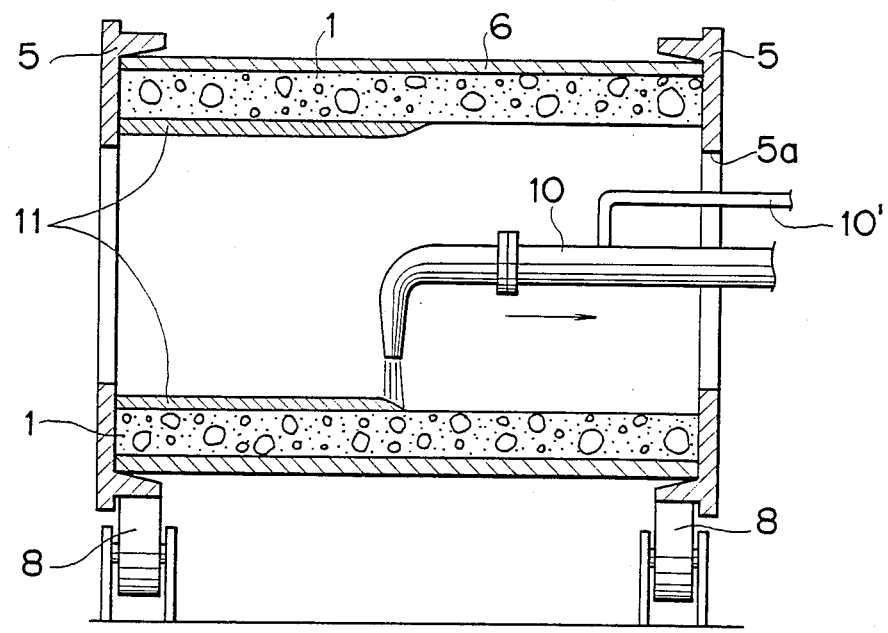
FIG. 3 is a sectional side view of the apparatus of FIGS. 2A and 2B to show the step of forming a resin layer of the concrete type composite pipe.

(b) Step for forming the corrosion protective layer 2:

(i) The concrete in layer after being subjected to the tightening or physically hardening step but not chemically hardened yet as described above is known as fresh concrete. A step of forming the corrosion protective layer 2 is required to be started before said fresh concrete is chemically hardened. More specifically, an injection pipe 10 is inserted through longitudinally through said drum mold 6 by way of the opening 5a as shown in FIG. 3 normally immediately after the drum mold is stopped. Then, the valve (not shown) is opened to pour down a hydrophilic resion (for example two liquid type water emulsion epoxy resin) mixed with a hardener. At the same time, the drum mold 6 is again stated to rotate to obtain an acceleration of centrifugal force of normally 5 to 20 g in the proximity of the inner surface of the drum mold 6.

In this case, the resin having good flowability quickly spreads in inner surface of the concrete layer 1 due to centrifugal force, with the result that the resion layer 11 having a uniform thickness is formed within short periods of time.

As described above, the resin is required to have a hydrophilic property since it comes into contact with the concrete layer 1 that has not been solidified yet.

As a hydrophilic resin to be used in this embodiment, there is bisphenol A type epoxy resin (trade name -EPI-KOTE 828 from Yuka Shell Epoxy K.K.) which is to be emulsified with 1 water of 1 to 40 weight percent of the resin. In place thereof, Der 331 from Dow-Chemical Co. or AER 331 of Asahi Kasei K.K. may be used after being subjected to the above treatment. In the above cases, water is preferably in a small amount in the above range.

On the other hand, the hardener includes polyamide amine, modified polyamide amine, aliphatic polyamine, modified aliphatic polyamine etc. 30 to 70 parts by weight of any one of the above hardeners is mixed with 100 parts by weight of the hydrophilic resin.

The injection pipe 10 shown in FIG. 3 has an inner diameter of 2 to 3 centimeters and the hydrophilic resin is discharged under velocity of 0.2 to 0.4 meters per second. Furthermore, a hardener pipe 10' is joined to the injection pipe 10 at a portion 1.2 meters from the outlet. Even if the mixture contains 70 parts by weight of hardener, the pipe 10 will not be blocked because the resin normally takes about 7 minutes to harden.

After the formation of the resin layer 11, the injection pipe 10 is immediately retracted by way of the opening 5a outwardly of the drum mold 6 to be stationed at a separate predetermined place.

Figure 4:
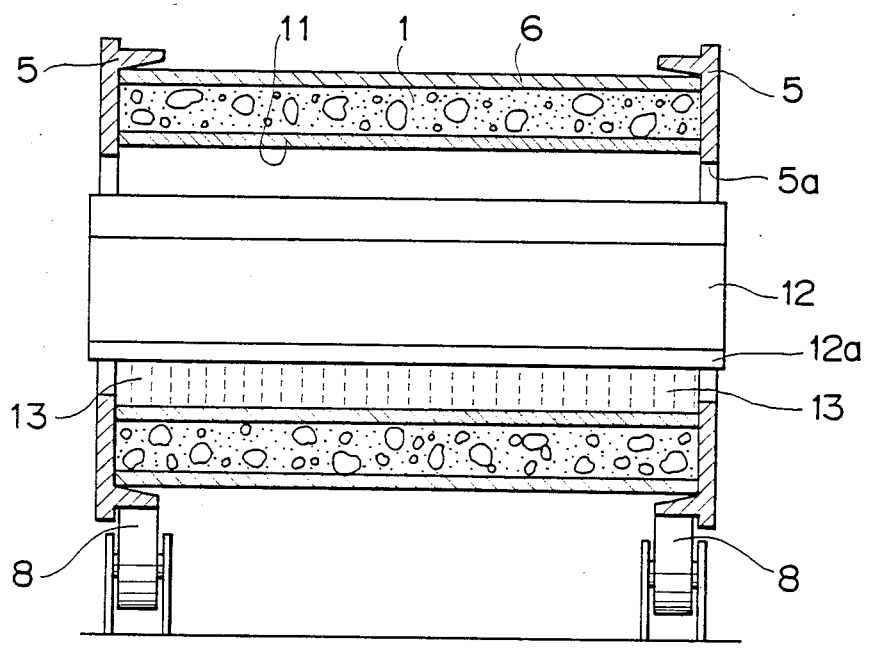
FIG. 4 is a sectional side view of the same apparatus showing the step of scattering the aggregates within the pipe.

(ii) Immediately after said injection pipe 10 is taken out of the drum mold 6, a hopper is introduced thereinto. As shown in FIG. 4, said hopper 12 has about the same longitudinal length as the drum mold 6 and contains aggregate and the like therein. Said aggregates and the like is scattered onto the inner surface of the resin layer 11 by opening a gate 12a in the bottom thereof.

Thereafter, said hopper 12 is retracted by way of opening 15a outwardly of the drum mold 6 to be stationed a further predetermined place. At the same time, the motor output is raised to such an extent that an acceleration of centrifugal force of preferably 10 to 15 g and at most 30 to 40 g is obtained.

Since the hopper 12 has a length nearly equal to that of the drum mold 6 in the lengthwise direction thereof, the aggregate 13 is uniformly ascattered onto the resin layer 11 within a short period of time. The drum mold 6 is rotated in this condition for an suitable period of time and stopped after the resin hardness.

According to this method of production, the ratio of resin to aggregate can be varied over a very side range.

(iii) In the above-mentioned step (ii), the aggregate 13 floates on the resin layer 11 during the initial stage of scattering. Then, coarse particles in the aggregate 13 precipitate, first, owing to the action of centrifugal force and bite into the concrete layer 1 that has not yet been solidified. Namely, there is formed the mixed intermediate layer 4 consisting of the resin and the concrete and having properties that lie between those of the concrete layer 1 and those of the corrosion protective layer 2 as shown in FIGS. 1A and 1B.

Since fine particles of aggregate 13 are distributed near the inner surface of the corrosion protective layer 2, there is obtained a smooth surface having a small coarseness coefficient.

When it is required to produce a concrete-type composite pipe A having increased resistance against chemicals and strength, the thickness of the corrosion protective layer 2 should be increased to meet the demand.

In the foregoing was described the case where the inner layer was comprised of the corrosion protective layer. When the outer layer is to be comprised of the corrosion protective layer, however, the corrosion protective layer should be centrifugally formed, and the concrete should be thrown onto the inner surface of the corrosion protective layer under the condition where it is not yet hardened to form the layer in a centrifugal manner. It is also possible to form the corrosion protective layer on both the inner and outer surfaces of the concrete layer.

It was confirmed that the corrosion protective layer of the concrete-type composite pipe produced by the above-mentioned method was not peeled off even after it was subjected to the exposure testing in which the outside was heated at 90° C. and the inside was heated at 50° C.

(Effects)

(a) The concrete-type composite pipe of the present invention exhibits the following effects:

(i) It exhibits large rigidity and strength, as well as excellent resistance against chemicals.

(ii) The mixed intermediate layer of resin and concrete helps reliably prevent the concrete layer and the corrosion protective layer from being peeled off.

(b) The method of producing a concrete-type composite pipe according to the present invention exhibits the following effects:

(i) In centrifugally forming the corrosion protective layer by successively throwing the resin and the aggregate onto the concrete layer that has not been solidified yet, there is formed a mixed intermediate layer consisting of resin and concrete having properties that lie between those of the concrete layer and those of the corrosion protective layer.

(ii) The resin having good flowability is thrown first so that it is quickly spread thereby to centrifugally form a resin layer having a uniform thickness within short periods of time.

(iii) The aggregate is scattered next to the resin from a hopper having a length nearly equal to the length of the concrete layer in the lengthwise direction thereof; i.e., the aggregate is uniformly scattered within short periods of time.

(iv) The resin and the aggregate are thrown separately using simply constructed devices presenting advantage in economy. After the use, furthermore, the devices can be cleaned up easily contributing to saving the labor.

What is claimed is:

1. A centrifugally molded concrete-type composite pipe, comprising
   a cylindrical, centrifugally formed concrete layer including aggregates;
   a cylindrical, corrosion protective layer concentrically laminated inwardly adjacent said cylindrical concrete layer, said corrosion protective layer being formed of a mixture of resin and fine and coarse aggregates with fine aggregates distributed near the inner surface of the corrosion protective layer;
   an intermediate layer composed of mixed resin and concrete including coarse aggregates centrifugally precipated from the corrosion protective layer and penetrating into said concrete layer and formed in a boundary region between said cylindrical concrete layer and said cylindrical corrosion protective layer having physical properties intermediate those of said concrete layer and said corrosion protective layer,
   said composite pipe being at least in part formed by centrifugal action due to rotation of said cylindrical concrete layer and said resin and fine and coarse aggregate containing corrosion resistant layer about their common longitudinal axis while the concrete and resin are not completely hardened in such a manner that part of said resin of said corrosion protective layer is intermixed with said concrete layer at the interface between said concrete layer and said adjacent corrosion protective layer, said intermixing being the result of said contrifugal action.

2. A concrete-type composite pipe according to claim 1, wherein said corrosion protective layer is located radially inwardly of said cylindrical concrete layer.

3. A concrete-type composite pipe as claimed in claim 1, wherein said concrete layer has a first coefficient of thermal expansion and contraction, said corrosion protective layer has a second coefficient of thermal expansion and contraction, said first and said second coefficients of thermal expansion and contraction have different values, due to being formed of different physical components and said intermediate layer of mixed resin and concrete having a thermal coefficient of expansion and contraction which is intermediate said first and said second thermal coefficients as a result of being a mixture of components of said concrete layer and said corrosion resistant layer.

4. A concrete-type composite pipe, comprising
   a cylindrical, centrifugally formed concrete layer having a first coefficient of thermal expansion and contraction;
   a cylindrical, corrosion protective layer concentrically laminated adjacent said cylindrical concrete layer, said corrosion protective layer being formed of a mixture of resin and aggregates comprised of particles ranging from relatively coarse to relatively fine, said corrosion protective layer having a second coefficient of thermal expansion and contraction;
   an intermediate layer composed of mixed resin and concrete formed in a boundary region between said cylindrical concrete layer and said cylindrical corrosion protective layer, said intermediate layer having thermal coefficient of expansion and contraction properties intermediate those of said concrete layer and said corrosion protective layer and being formed by centrifugal action due to rotation of said concrete and resin-containing cylindrical layers about their common longitudinal axis while the concrete and resin are not completely hardened in such manner that part of the resin of said corrosion protective layer is mixed with said adjacent concrete layer and also relatively coarse particles of aggregate in mixture with said resin penetrate said concrete layer.

5. A concrete-type composite pipe as claimed in claim 4, wherein said corrosion protective layer is located radially inwardly of said cylindrical concrete layer.

6. A concrete-type composite pipe according to claim 1, wherein said resin of said corrosion protective layer is a hydrophilic resin mixed with a hardener.

7. A concrete-type composite pipe according to claim 6, wherein said resin having good flowability spreads on said cylindrical layer due to centrifugal force and forming said corrosion protective layer having the uniform thickness.

8. A concrete-type composite pipe according to claim 6, wherein said hydrophilic resin is bisphenol A type epoxy resin which is emulsified with water.

9. A concrete-type composite pipe according to claim 6, wherein said hardener is one of polyamide amine and aliphatic polyamine.

* * * * *